United States Patent
Lai (10) Patent No.: US 9,254,710 B2
(45) Date of Patent: Feb. 9, 2016

(54) SUPPORTING DEVICE FOR A BICYCLE WHEEL

(71) Applicant: Chung-Lin Lai, Taichung (TW)

(72) Inventor: Chung-Lin Lai, Taichung (TW)

( * ) Notice: Subject to any disclaimer, the term of this patent is extended or adjusted under 35 U.S.C. 154(b) by 86 days.

(21) Appl. No.: 14/174,354

(22) Filed: Feb. 6, 2014

(65) Prior Publication Data
US 2014/0225422 A1    Aug. 14, 2014

(30) Foreign Application Priority Data

Feb. 8, 2013    (TW) .............................. 102203051 U (51) Int. Cl.
| | |
|---|---|
| *B60B 3/12* | (2006.01) |
| *B60B 1/00* | (2006.01) |
| *B60B 1/02* | (2006.01) |
| *B60B 7/00* | (2006.01) |
| *B60B 7/04* | (2006.01) |
| *B60B 7/06* | (2006.01) |

(52) U.S. Cl.
CPC ............... *B60B 1/003* (2013.01); *B60B 1/0215* (2013.01); *B60B 7/0006* (2013.01); *B60B 7/04* (2013.01); *B60B 7/063* (2013.01); *B60B 7/066* (2013.01)

(58) Field of Classification Search
CPC ........................................................ B60B 7/04
USPC .............. 301/8, 12.1, 61, 104, 55, 60, 37.102
See application file for complete search history.

(56) References Cited

U.S. PATENT DOCUMENTS

| | | | | |
|---|---|---|---|---|
| 1,413,491 | A * | 4/1922 | Preuss ............................... 301/8 |
| 3,317,246 | A * | 5/1967 | Wester ....................... 301/37.41 |
| 3,390,917 | A * | 7/1968 | Tilghman et al. .......... 301/37.41 |
| 4,046,425 | A * | 9/1977 | Sardinha ...................... 301/12.1 |
| 5,452,945 | A * | 9/1995 | Schlanger ........................ 301/58 |
| 5,707,114 | A * | 1/1998 | Schlanger ........................ 301/58 |
| 6,196,638 | B1 * | 3/2001 | Mizuno et al. ................. 301/104 |
| 6,428,116 | B1 * | 8/2002 | Chou ............................ 301/104 |
| 6,793,294 | B2 * | 9/2004 | Shih ........................... 301/37.41 |
| 6,942,302 | B2 * | 9/2005 | Osterlund et al. ......... 301/37.105 |
| 7,581,794 | B1 * | 9/2009 | Milow ...................... 301/37.102 |
| 2008/0284237 | A1 * | 11/2008 | Tsai ................................. 301/58 |
| 2009/0152938 | A1 * | 6/2009 | Tsai ................................. 301/55 |
| 2014/0225422 | A1 * | 8/2014 | Lai .................................... 301/8 |

* cited by examiner

*Primary Examiner* — Jeffrey J Restifo (74) *Attorney, Agent, or Firm* — Muncy, Geissler, Olds & Lowe, P.C.

(57) ABSTRACT

A supporting device is adapted to be mounted on a bicycle wheel and includes a central cap unit, a plurality of end seats, and a plurality of covering units. The bicycle wheel includes a hub and a wheel rim. The central cap unit is sleeved fixedly on the hub and has coupling portions. The end seats are connected fixedly on the wheel rim, and are formed respectively with coupling sections registered respectively with the coupling portions. Each of the covering units has an inner end portion connected to a respective one of the coupling portions of the central cap unit and an outer end portion connected to one of the coupling sections of the end seats that is registered with the respective one of the coupling portions, so as to enhance a structural strength of the bicycle wheel.

7 Claims, 7 Drawing Sheets

SUPPORTING DEVICE FOR A BICYCLE WHEEL

CROSS-REFERENCE TO RELATED APPLICATION

This application claims priority of Taiwanese Patent Application No. 102203051, filed on Feb. 8, 2013, the entire disclosure of which is hereby incorporated by reference.

BACKGROUND OF THE INVENTION

1. Field of the Invention

This invention relates to a supporting device, more particularly to a supporting device for a bicycle wheel.

2. Description of the Related Art

A conventional bicycle wheel includes a hub, a wheel rim, and a plurality of spokes. Each of the spokes is configured as a narrow stick that has an end connected securely to a spoke-installation portion of the hub, and an opposite end connected fixedly to the wheel rim through a locking member (e.g., a screw). However, the spoke has a relatively weak strength because of its shape and is easily deformed and damaged by external force, thereby affecting structural strength and roundness of the bicycle wheel.

Another conventional bicycle wheel uses a plurality of spoke plates to replace the abovementioned conventional spokes. Each of the spoke plates is sandwiched between and riveted to the hub and the wheel rim so as to enhance the structural strength of the bicycle wheel. However, precise riveting is difficult. Moreover, since the wheel rim is subjected to a relatively large external force during the riveting process, a roundness of the wheel rim is hard to maintain.

SUMMARY OF THE INVENTION

Therefore, the object of the present invention is to provide a supporting device for a bicycle wheel that can overcome at least one of the aforesaid drawbacks of the prior art.

According to this invention, a supporting device for a bicycle wheel is adapted to be mounted on a bicycle wheel. The bicycle wheel includes a hub that has a central axis and a wheel rim that surrounds the central axis. The supporting device includes a central cap unit, a plurality of angularly spaced-apart end seats, and a plurality of covering units. The central cap unit is adapted to be sleeved fixedly on the hub and has a plurality of coupling portions radially distal from the hub. The end seats are adapted to be connected fixedly on the wheel rim, and are formed respectively with a plurality of coupling sections registered respectively with the coupling portions of the central cap unit in radial directions. Each of the covering units has an inner end portion and an outer end portion. The inner end portion is connected to a respective one of the coupling portions of the central cap unit, and the outer end portion is connected to one of the coupling sections of the end seats that is registered with the respective one of the coupling portions, so as to enhance a structural strength of the bicycle wheel.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
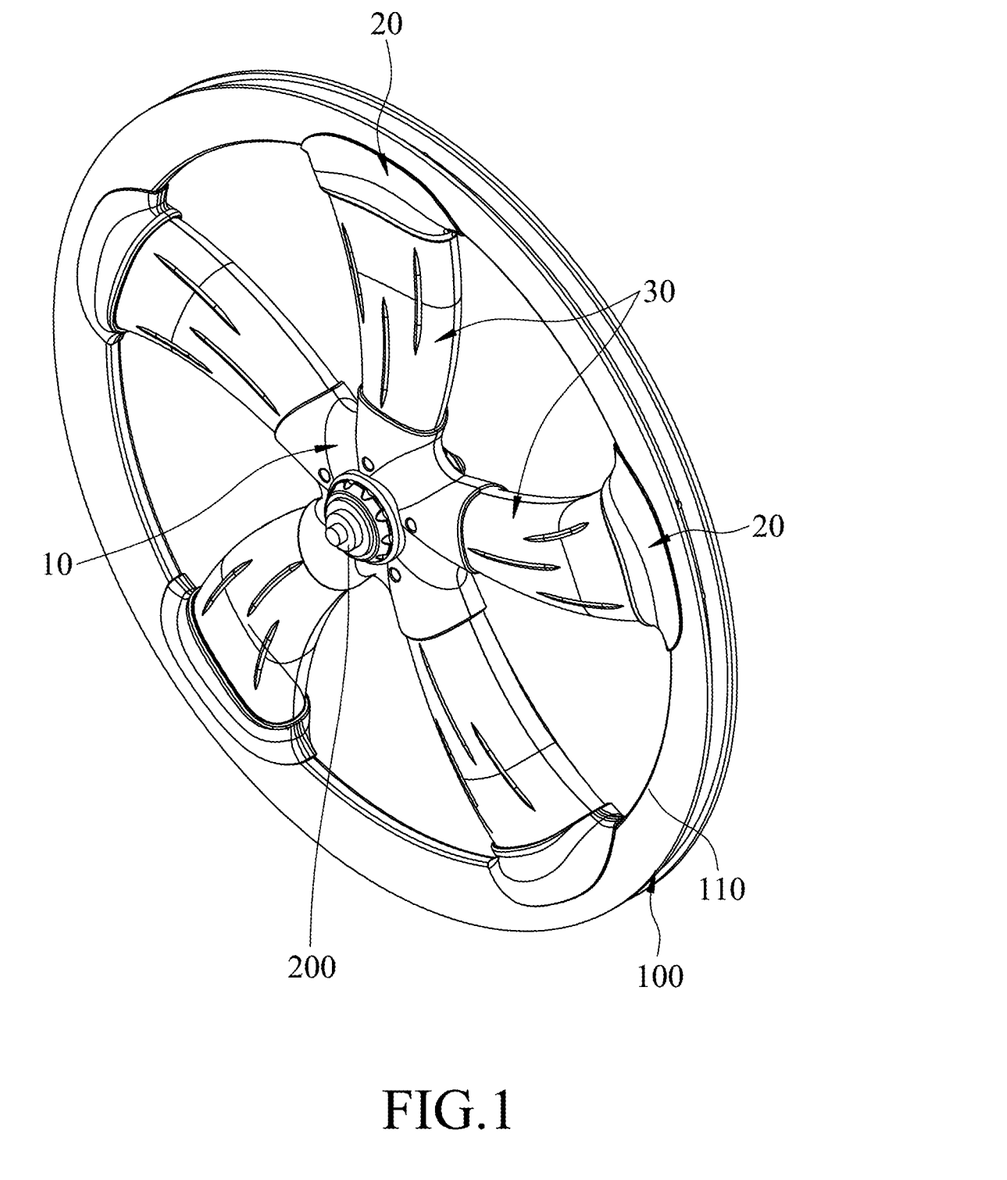
FIG. 1 is an assembled perspective view of a bicycle wheel mounted with the preferred embodiment of a supporting device according to this invention.
Figure 2:
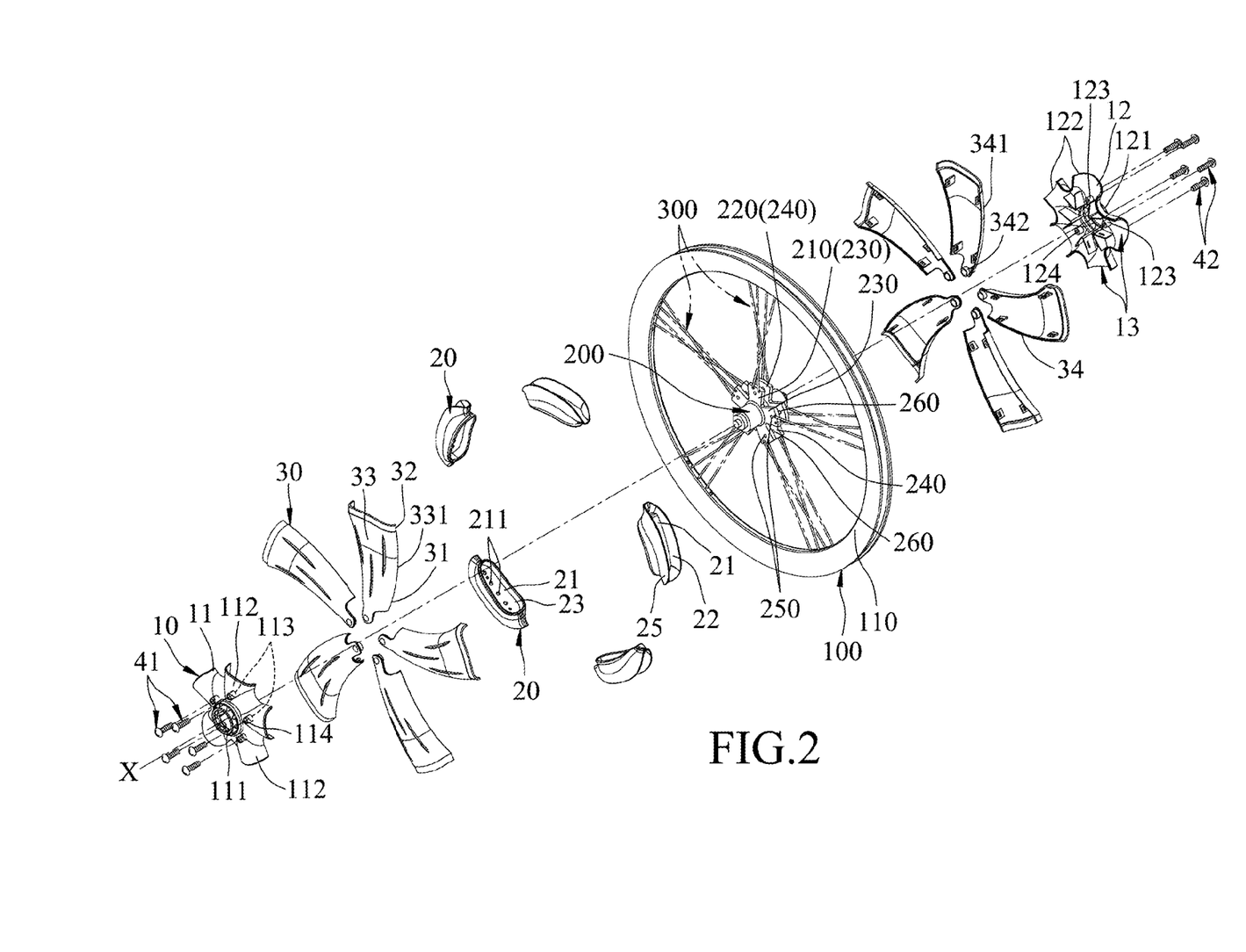
FIG. 2 is an exploded perspective view of the preferred embodiment and the bicycle wheel.

A preferred embodiment of a supporting device for a bicycle wheel according to the present invention is shown in FIGS. 1 and 2. The bicycle wheel includes a hub 200, a wheel rim 100, and a plurality of spoke units 300.

The hub 200 has a central axis (X), and first and second spoke-installation portions 210, 220 spaced apart from each other along the central axis (X). The first spoke-installation portion 210 includes a plurality of angularly spaced-apart first positioning plates 230 that are formed respectively with first positioning holes 250. The second spoke-installation portion 220 includes a plurality of angularly spaced-apart second positioning plates 240 that are formed respectively with second positioning holes 260. The wheel rim 100 surrounds the central axis (X) and has a substantially U-shaped inner surrounding surface 110 (see FIG. 5). Each of the spoke units 300 has a plurality of spoke members 310 that interconnect the wheel rim 100 and the first and second spoke-installation portions 210, 220 of the hub 200.

The supporting device includes a central cap unit 10, a plurality of angularly spaced-apart end seats 20, a plurality of covering units 30, and a plurality of first and second locking elements 41, 42.

The central cap unit 10 is adapted to be sleeved fixedly on the hub 200 and to cover the first and second spoke-installation portions 210, 220, and has a plurality of coupling portions 13 that are radially distal from the hub 200. The central cap unit 10 includes a first cap member 11 disposed at a side of the first spoke-installation portion 210 that is opposite to the second spoke-installation portion 220 along the central axis (X), and a second cap member 12 disposed at a side of the second spoke-installation portion 220 that is opposite to the first spoke-installation portion 210 along the central axis (X) and coupled to the first cap member 11.

Figure 5:
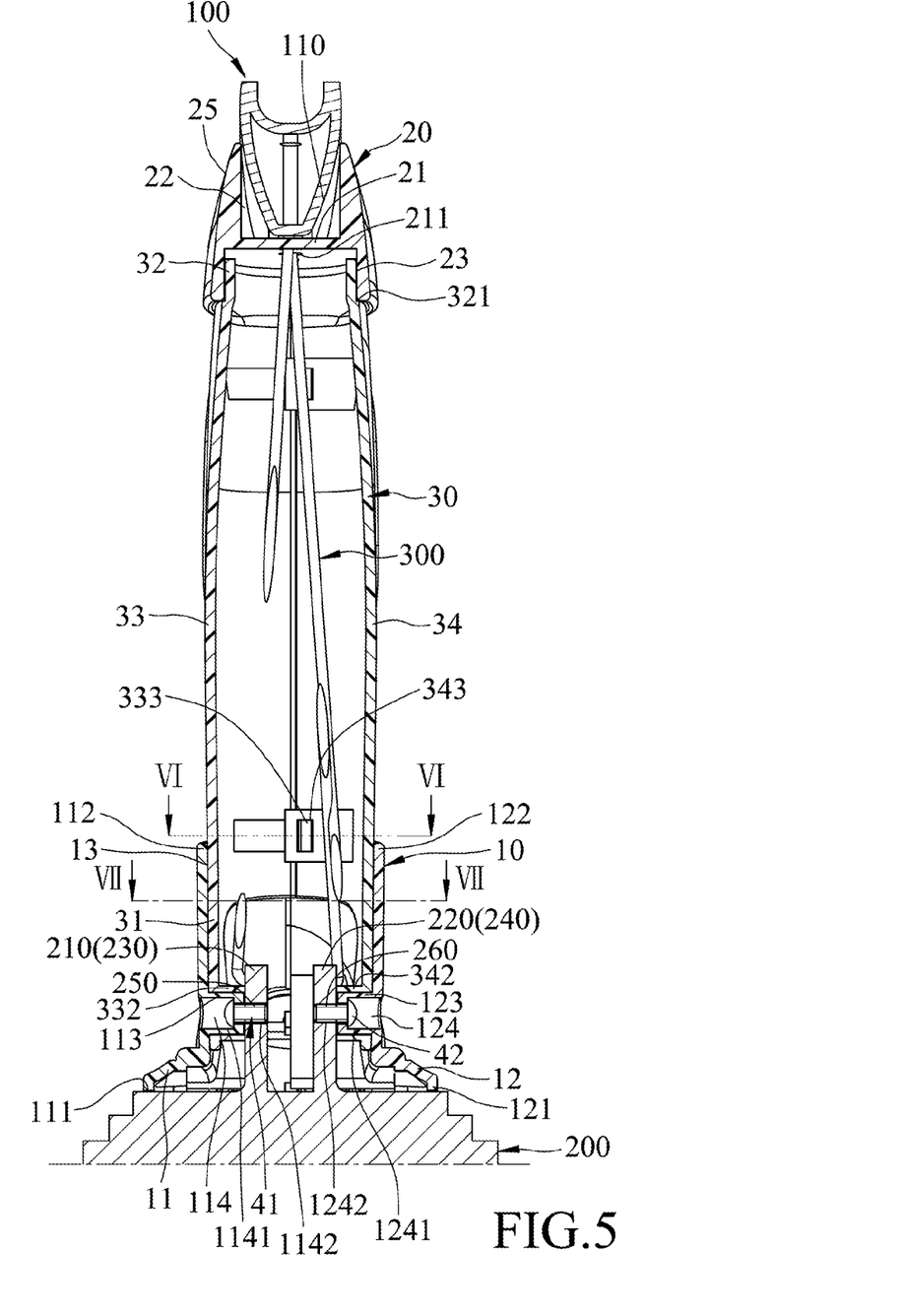
FIG. 5 is a fragmentary sectional view of the preferred embodiment and the bicycle wheel taken along line V-V in FIG. 4.

The first cap member 11 has a first annular portion 111 sleeved fixedly on the hub 200, a plurality of first extending portions 112, and a plurality of first positioning columns 113. As shown in FIGS. 1, 2 and 5, the first extending portions 112 extend radially and outwardly from the first annular portion 111. The first positioning columns 113 extend toward the second cap member 12. Each of the first positioning columns 13 is formed with a first fixing hole 114 having a first hole portion 1141 that is distal from the second cap member 12, and a second hole portion 1142 that is proximate to the second cap member 12 and smaller than the first hole portion 1141.

Figure 7:
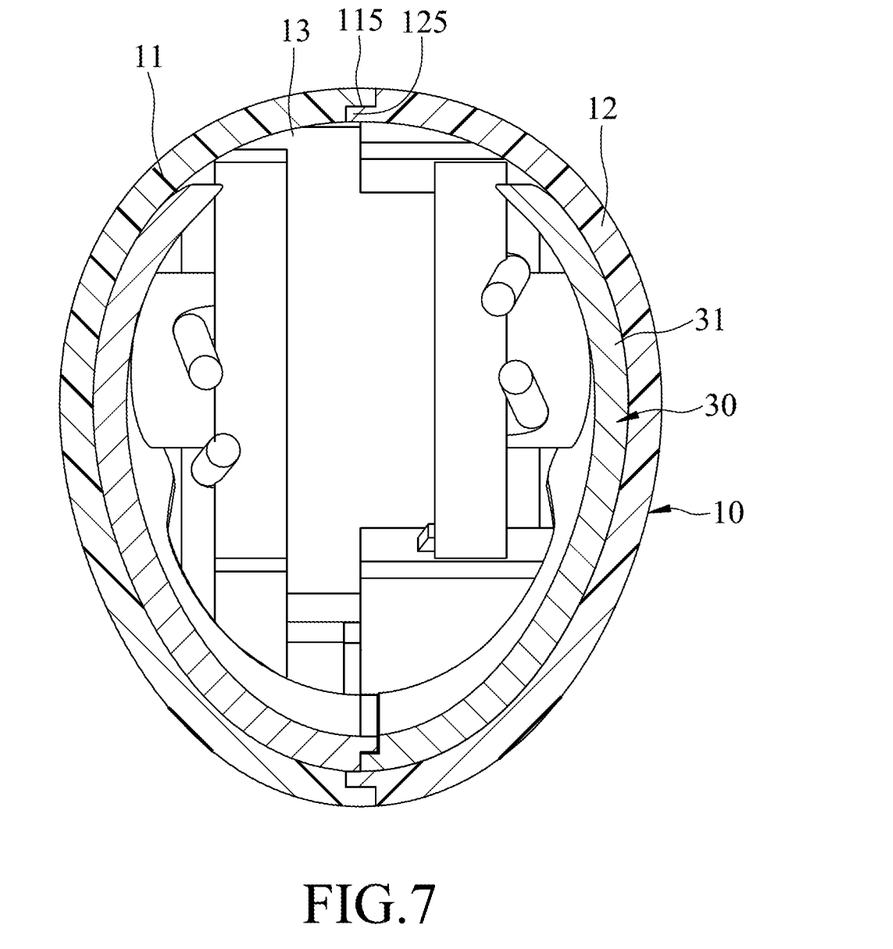
FIG. 7 is a sectional view of the preferred embodiment and the bicycle wheel taken along line VII-VII in FIG. 5.

The second cap member 12 has a second annular portion 121 sleeved fixedly on the hub 200, a plurality of second extending portions 122, and a plurality of second positioning columns 123. The second extending portions 122 extend radially and outwardly from the second annular portion 121. The second positioning columns 123 extend toward the first cap member 11. Each of the second positioning columns 123 is formed with a second fixing hole 124 having a first hole portion 1241 that is distal from the first cap member 11, and a second hole portion 1242 that is proximate to the first cap member 11 and smaller than the first hole portion 1241. As shown in FIG. 7, the first cap member 11 further has a connecting groove 115 that is formed at a periphery thereof, and the second cap member 12 further has a connecting protrusion 125 that is formed at a periphery thereof and that engages the connecting groove 115. Referring back to FIGS. 1, 2 and 5, the first extending portions 112 of the first cap member 11 and the second extending portions 122 of the second cap member 12 cooperatively define the coupling portions 13 of the central cap unit 10. Each of the coupling portions 13 is configured to define a cavity and has an opening facing the wheel rim 100.

Figure 4:
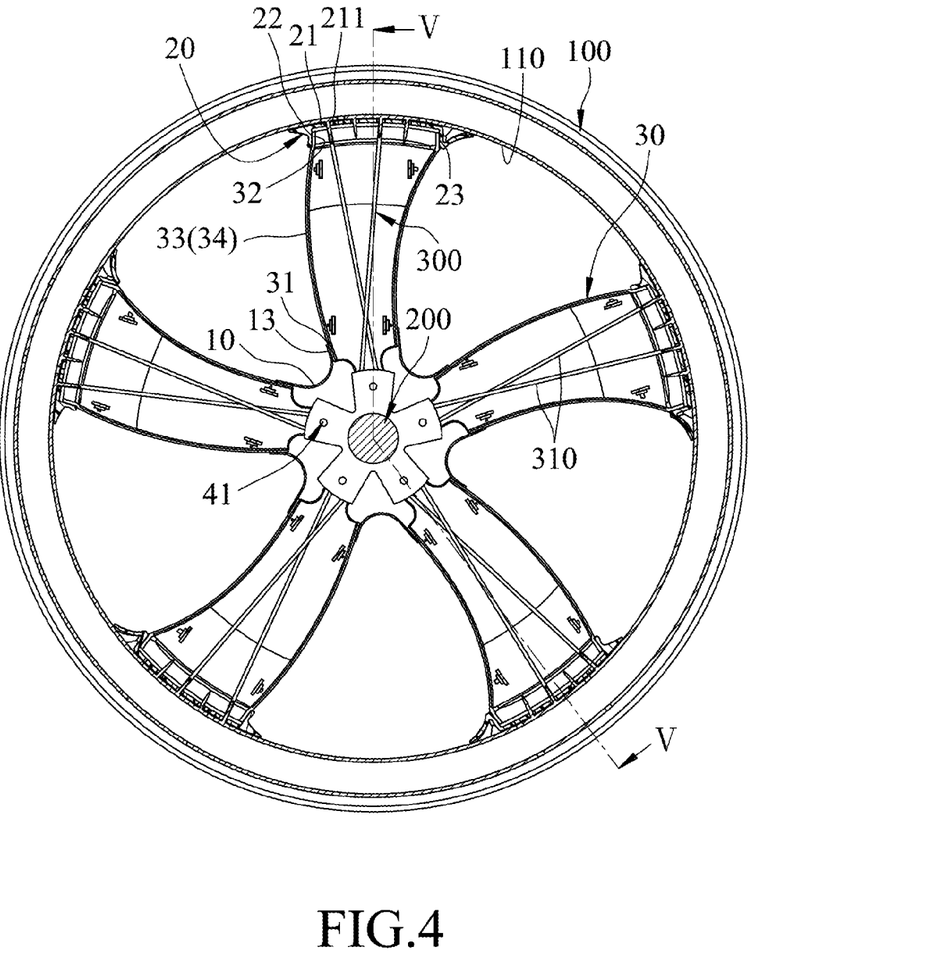
FIG. 4 is an assembled sectional view of the preferred embodiment and the bicycle wheel.

Referring to FIGS. 1, 4 and 5, the end seats 20 are adapted to be connected fixedly on the wheel rim 100. Each of the end seats 20 has a plate member 21, a rim-connecting section 25 and a coupling section 23. The plate member 21 is adapted to abut against the inner surrounding surface 110 of the wheel rim 100, has radial inner and outer surfaces, and is formed with a plurality of through holes 211 extending through the radial inner and outer surfaces and adapted for extension of the spoke members 310 of a respective one of the spoke units 300. The rim-connecting section 25 is connected to the radial outer surface of the plate member 21 and is formed with a receiving space 22 adapted for receiving a portion of the wheel rim 100. The coupling section 23 is connected to the radial inner surface of the plate member 21, is registered with a respective one of the coupling portions 13 of the central cap unit 10 in a radial direction, and is configured to define a cavity. It should be noted that, during assembly, the spoke members 310 of each of the spoke units 300 extend respectively through the through holes 211 of the respective one of the end seats 20 before being mounted on the wheel rim 100.

Figure 3:
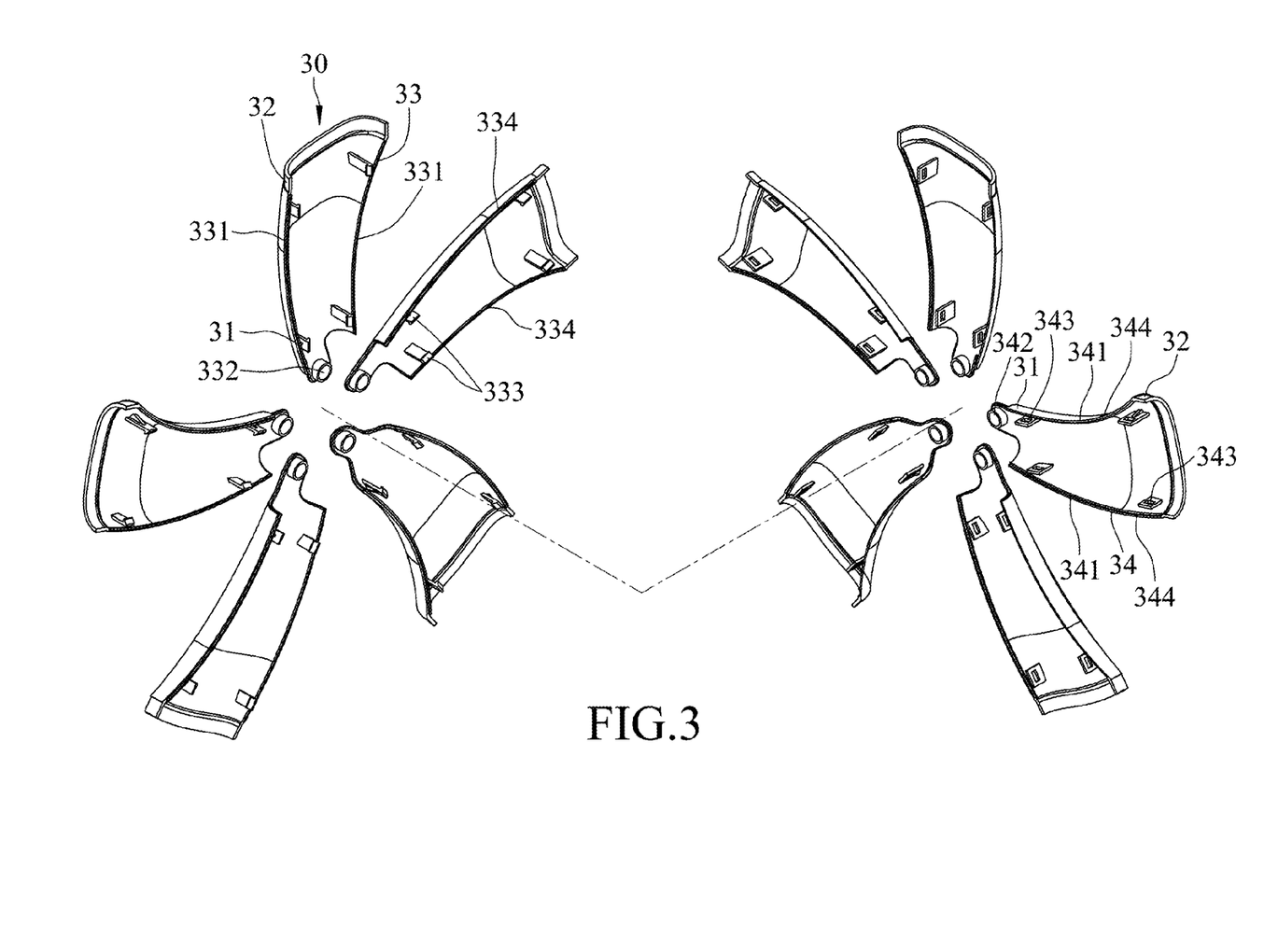
FIG. 3 is an exploded perspective view of covering units of the preferred embodiment.
Figure 6:
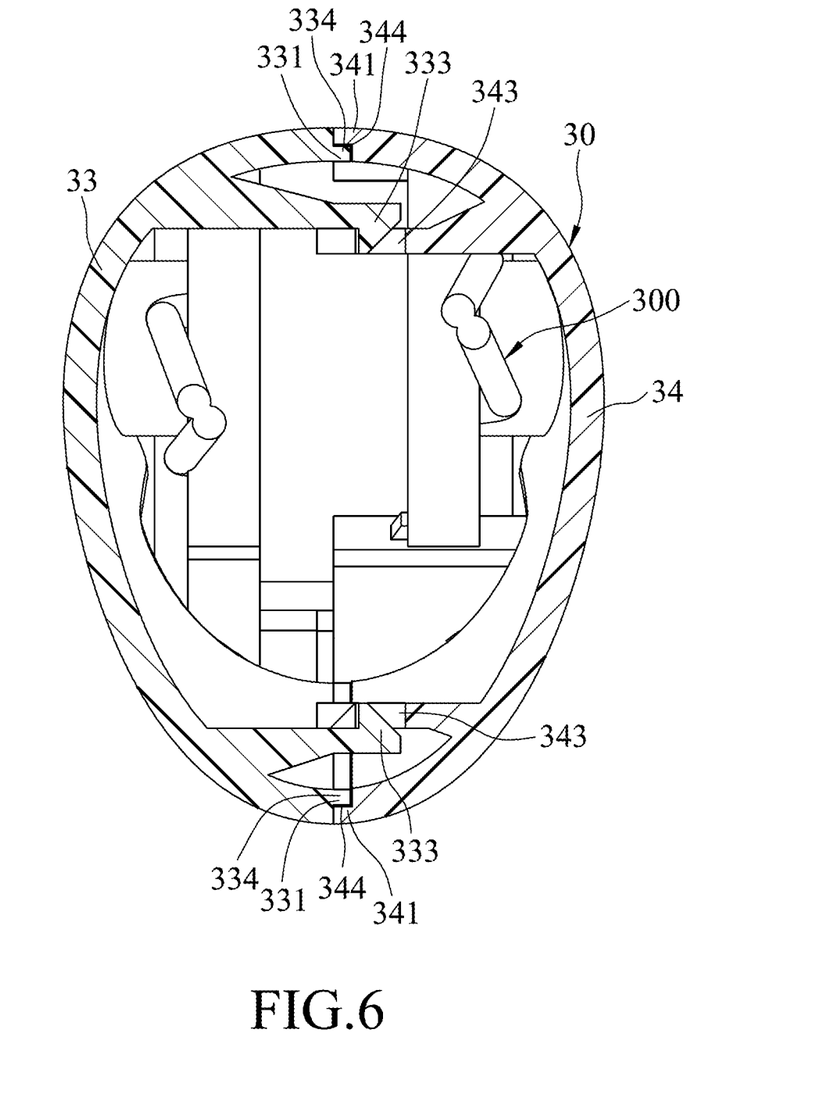
FIG. 6 is a sectional view of the preferred embodiment and the bicycle wheel taken along line VI-VI in FIG. 5.

Referring to FIGS. 3, 5 and 6, each of the covering units 30 is adapted for covering the spoke members 310 of a respective one of the spoke units 300, and has an inner end portion 31 that is inserted into a respective one of the coupling portions 13 of the central cap unit 10, and an outer end portion 32 that is inserted into the cavity defined by the coupling section 23 that is registered with the respective one of the coupling portions 13. Each of the covering units 30 includes a first covering member 33 adjacent to the first cap member 11 and a second covering member 34 adjacent to the second cap member 12 and connected to the first covering member 33. Radial inner portions of the first and second covering members 33, 34 of each of the covering units 30 cooperatively define the inner end portion 31 of the covering unit 30. Radial outer portions of the first and second covering members 33, 34 of each of the covering units 30 cooperatively define the outer end portion 32 of the covering unit 30. The outer end portion 32 has a stepped shoulder surface 321 that abuts against a distal end of the coupling section 23 that is registered with the respective one of the coupling portions 13. The first covering member 33 has a pair of first lateral edges 331, a first ring 332 surrounding a respective one of the first positioning columns 113, and a plurality of engaging hooks 333 disposed between the inner end portion 31 and the outer end portion 32. The first lateral edges 331 extend from the inner end portion 31 to the outer end portion 32 and are formed respectively with two elongated protrusions 334. The second covering member 34 has a pair of second lateral edges 341, a second ring 342 surrounding a respective one of the second positioning columns 123, and a plurality of engaging holes 343 disposed between the inner end portion 31 and the outer end portion 32 and respectively engaged with the engaging hooks 333 of the first covering member 33. The second lateral edges 341 extend from the inner end portion 31 to the outer end portion 32 and are formed respectively with two elongated grooves 344 that are engaged respectively with the protrusions 334 of the first lateral edges 331 of the first covering member 33 (see FIG. 6).

The first locking elements 41 extend respectively through the first fixing holes 114 of the first positioning columns 113 and are secured threadedly and respectively to the first positioning holes 250 of the first spoke-installation portion 210 of the hub 200. The second locking elements 42 extend respectively through the second fixing holes 124 of the second positioning columns 123 and are secured threadedly and respectively to the second positioning holes 260 of the second spoke-installation portion 220 of the hub 200.

In conclusion, the covering units 30 cover the spoke units 300 so as to prevent the spoke units 300 from being deformed and damaged by an external force. As a result, a service life of the bicycle wheel can be lengthened. The covering units 30, the central cap unit 10 and the end seats 20 as a whole serves as a support between the wheel rim 100 and the hub 200 so as to enhance a structural strength of the bicycle wheel and to maintain a roundness of the bicycle wheel. Moreover, appearance of the bicycle wheel after being mounted with the supporting device can also be improved.

It should be noted that the engagements between the engaging hooks 333 and the engaging holes 343, between the inner end portions 31 of the covering units 30 and the coupling portions 13 of the central cap unit 10, and between the inner end portions 31 of the covering units 30 and the coupling sections 23 of the end seats 20 can all be accomplished easily. Moreover, design of the engagement between the connecting groove 115 and the connecting protrusion 125 is able to prevent water and dust from entering an inner space between the first and second cap members 11, 12 so as to further lengthen the service life of the bicycle wheel. Similarly, design of the engagement between the groove 344 and the protrusion 334 is able to prevent water and dust from entering an inner space between the first and second covering members 33, 34.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A supporting device for a bicycle wheel adapted to be mounted on a bicycle wheel, the bicycle wheel including a hub that has a central axis and a wheel rim that surrounds the central axis, the hub further having first and second spoke-installation portions that are spaced apart from each other along the central axis, the bicycle wheel further including a plurality of spoke units, each having a plurality of spoke members that interconnect the wheel rim and the first and second spoke-installation portions of the hub, said supporting device comprising:

a central cap unit adapted to be sleeved fixedly on the hub and having a plurality of coupling portions that are radially distal from the hub;

a plurality of angularly spaced-apart end seats adapted to be connected fixedly on the wheel rim, and formed respectively with a plurality of coupling sections that are registered respectively with said coupling portions of said central cap unit in radial directions; and a plurality of covering units, each of said covering units having an inner end portion that is connected to a respective one of said coupling portions of said central cap unit, and an outer end portion that is connected to one of said coupling sections of said end seats that is registered with the respective one of said coupling portions, so as to enhance a structural strength of the bicycle wheel;

wherein said central cap unit includes
- a first cap member adapted to be disposed at a side of the first spoke-installation portion opposite to the second spoke-installation portion along the central axis, and having a first annular portion that is adapted to be sleeved on the hub and a plurality of first extending portions that extend radially and outwardly from said first annular portion, and
- a second cap member adapted to be disposed at a side of the second spoke-installation portion opposite to the first spoke-installation portion along the central axis, having a second annular portion that is adapted to be sleeved on the hub and a plurality of second extending portions that extend radially and outwardly from said second annular portion, and coupled to said first cap member, said first extending portions of said first cap member and said second extending portions of said second cap member cooperatively defining said coupling portions of said central cap unit;

wherein each of said end seats is further formed with a plurality of through holes adapted for extension of the spoke members of a respective one of the spoke units; and wherein each of said covering units is adapted for covering the spoke members of a respective one of the spoke units.

2. The supporting device as claimed in claim 1, wherein:
said coupling portions of said central cap unit are configured to define cavities; and
said inner end portion of each of said covering units is inserted into the respective one of said coupling portions of said central cap unit.

3. The supporting device as claimed in claim 2, wherein each of said covering units includes a first covering member adjacent to said first cap member and having a plurality of engaging hooks, and a second covering member adjacent to said second cap member, connected to said first covering member, and having a plurality of engaging holes that are respectively engaged with said engaging hooks, radial inner portions of said first and second covering members of each of said covering units cooperatively defining said inner end portion of the corresponding one of said covering units, radial outer portions of said first and second covering members of each of said covering units cooperatively defining said outer end portion of the corresponding one of said covering units.

4. The supporting device as claimed in claim 3, wherein:
said first covering member of each of said covering units further has two first lateral edges extending from said inner end portion to said outer end portion of the corresponding one of said covering units and formed respectively with two protrusions; and said second covering member of each of said covering units further has two second lateral edges extending from said inner end portion to said outer end portion of the corresponding one of said covering units and formed respectively with two grooves that are engaged respectively with said protrusions of said first lateral edges of said first covering member.

5. The supporting device as claimed in claim 4, wherein:
said first cap member further has a plurality of first positioning columns extending toward said second cap member, each of said first positioning columns being formed with a first fixing hole that has a first hole portion distal from said second cap member, and a second hole portion proximate to said second cap member and smaller than said first hole portion of said first fixing hole;

said second cap member further has a plurality of second positioning columns extending toward the first cap member, each of said second positioning columns being formed with a second fixing hole that has a first hole portion distal from said first cap member, and a second hole portion proximate to said first cap member and smaller than said first hole portion of said second fixing hole;

said first covering member of each of said covering units further has a first ring that surrounds a respective one of said first positioning columns, said second covering member of each of said covering units further having a second ring that surrounds a respective one of said second positioning columns; and said supporting device further comprising a plurality of first locking elements that extend respectively through said first fixing holes of said first positioning columns and that are adapted to be secured threadedly to the first spoke-installation portion of the hub, and a plurality of second locking elements that extend respectively through said second fixing holes of said second positioning columns and that are adapted to be secured threadedly to the second spoke-installation portion of the hub.

6. The supporting device as claimed in claim 5, wherein:
said first cap member of said central cap unit further has a connecting groove that is formed at a periphery thereof; and said second cap member of said central cap unit further has a connecting protrusion that is formed at a periphery thereof and that engages said connecting groove.

7. The supporting device as claimed in claim 1, wherein each of said end seats includes a plate member adapted to abut against the wheel rim, having radial inner and outer surfaces, and formed with said through holes that extend through said radial inner and outer surfaces, each of said end seats further including a rim-connecting section that is connected to said radial outer surface of said plate member and that is formed with a receiving space adapted for receiving a portion of the wheel rim, said coupling section of each of said end seats being connected to said radial inner surface of said plate member.

* * * * *